2 Sheets--Sheet 1.

D. H. SHERMAN.
Apparatus for Depilating Animal Carcasses.
No. 144,150. Patented Oct. 28, 1873.

Witnesses:

Inventor:
David H. Sherman
By Johnson, Klauske &co.
his Attorneys.

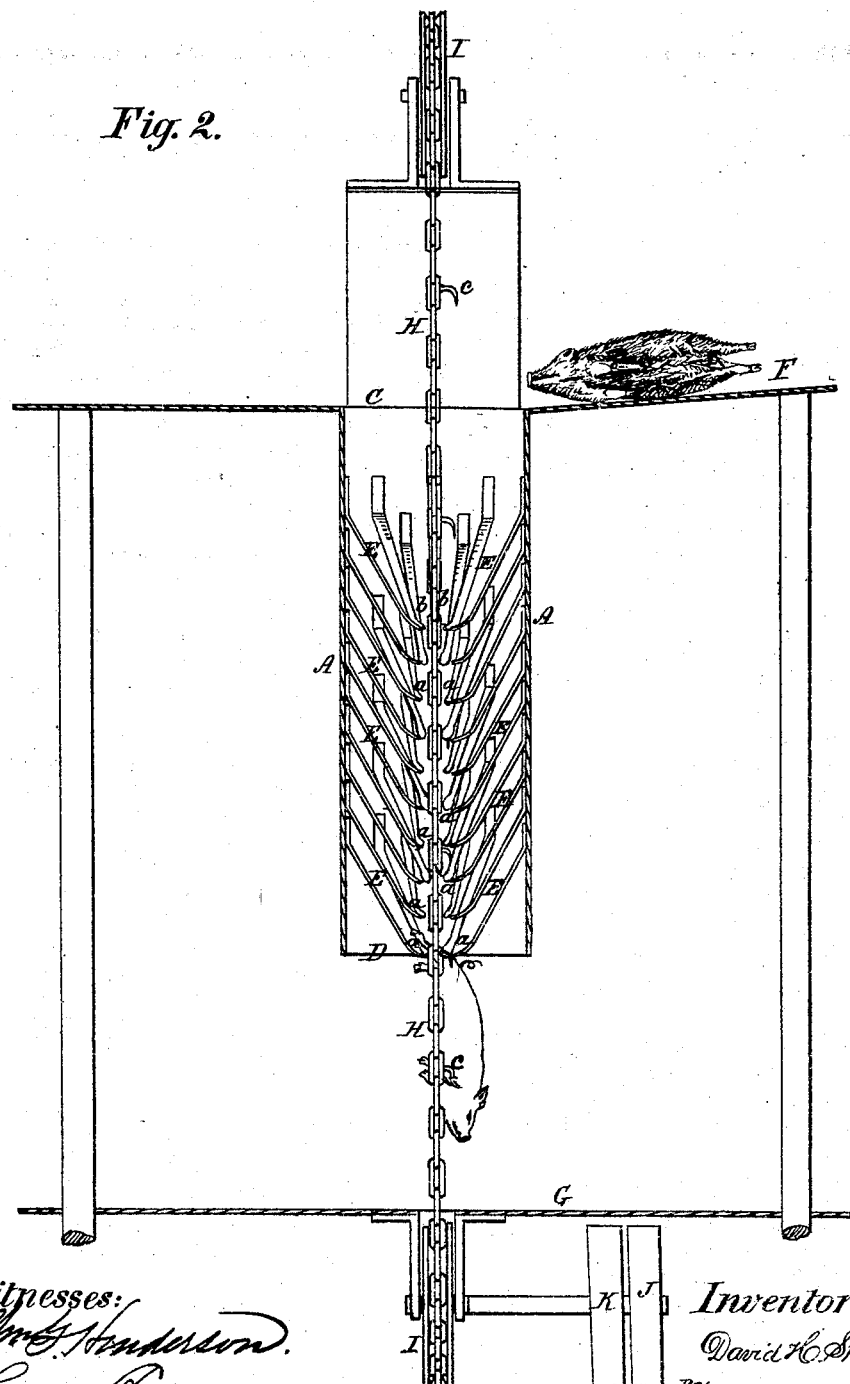

UNITED STATES PATENT OFFICE.

DAVID H. SHERMAN, OF JERSEY CITY, NEW JERSEY.

IMPROVEMENT IN APPARATUS FOR DEPILATING ANIMAL CARCASSES.

Specification forming part of Letters Patent No. 144,150, dated October 28, 1873; application filed January 27, 1873.

*To all whom it may concern:*

Be it known that I, DAVID H. SHERMAN, of Jersey City, in the county of Hudson and State of New Jersey, have invented a new and useful Improvement, being a Method of Depilating Animal Carcasses, and Apparatus therefor, of which the following is a specification:

My invention relates to removing hair from scalded hogs; and my said invention consists in the method of depilating scalded hogs by introducing the carcass into the upper open end of a trunk armed with downward-inclined spring-strippers, so that, by its own gravity and momentum, the carcass will effect its passage through said conduit from one end to the other, and, by such descent, be delivered at the bottom of the trunk stripped of its hair, the object and advantage of which method is to support the carcass upon all sides alike by a gentle pressure of the ends of the spring-arms, and prevent its resting upon any sharp points in its passage which would tear and cut the skin, as would be the case if the carcass were drawn through while resting by one side only upon the ends of the springs; also, in suspending an open trunk or hairing-conduit from a scalding table or floor, and arranging directly beneath, and a short distance from the open end of said trunk, a receiving-table, upon which the carcass is delivered by its own weight from the trunk, whereby a very convenient and practical arrangement is obtained in connection with the method of hairing a carcass by a movement effected by its own gravity when let fall through a space; also, in providing the acting ends of the spring-arms with spoon-shaped strippers, whereby a stripping-point is obtained which will not cut or injure the skin; and in the combination, with a vertical spring-armed stripping or depilating trunk, of an endless revolving feeding chain or carrier, to effect the passage of the carcass under the stripping operation when desired.

Figure 1:
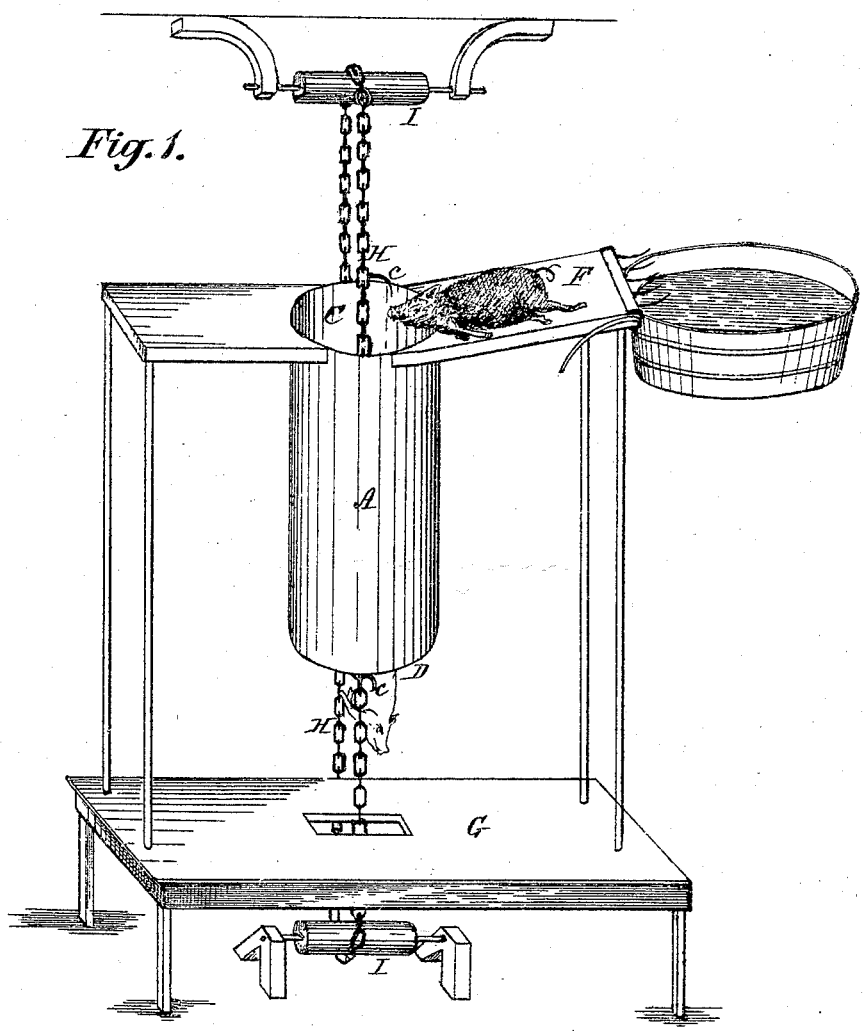

In the accompanying drawings, Figure 1 represents a view in perspective of a depilating apparatus embracing my invention. Fig. 2 represents a vertical section of the same, and Fig. 3 a horizontal section of the armed conduit or trunk.

Figure 3:
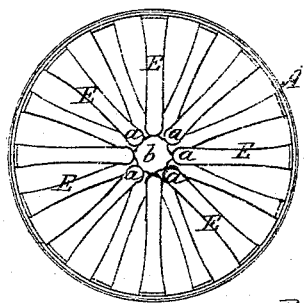

The apparatus consists of a cylinder or trunk, A, of any suitable construction and length, open at both ends, C D, and armed on its interior surface with a series of spring fingers or arms, E, terminating in curved spoon-shaped strippers $a$, which constitute a central skeleton passage, $b$, as shown in Figs. 2 and 3, through which the carcass passes. These spring stripping-arms E are arranged in series—one series above the other—and extend from the walls, to which they are fastened toward the center, leaving a space, $b$, much smaller in diameter than the carcass, which is passed through this net-work of arms, being introduced at the upper end C of the cylinder, and discharged at its lower end D, and in its transit is stripped of its hair and epidermis, so as to require little or no subsequent dressing, as the curved ends $a$ of the arms completely hug the carcass and conform to every inequality thereof. The cylinder or trunk is suspended from a scalding-table, F, in any suitable way that will allow the scalded carcass to be introduced therein and put upon its passage, and the receiving or dressing table G is placed a sufficient distance below the cylinder A to let out the carcass upon such table. The carcass may be carried through the cylinder by its weight and the force of its fall, in which case the cylinder should be long enough above the arms to give the proper momentum in the fall. A shorter cylinder may be used, and the carcass carried through it by an endless chain, H, provided with hooks $c$, and driven over pulleys I, so that it will pass through the cylinder, and, while moving, be hooked to and drag the carcass along to the lower table. The strength of the stripping-springs must be suitable for either of these conditions. The cylinder or trunk may be made sectional, or with its sides open, to afford facility for cleaning it out, and it may be suspended in water or otherwise.

The apparatus may be arranged in any suitable frame, and the pulleys of the endless carrier H placed so that the latter revolves with one side only through the cylinder, and may be driven by an engine or in any suitable way, the shaft of the lower pulley being provided with a fast and loose pulley, J K, for the driving-band. The endless revolving chain is designed as an auxiliary aid to the weight of the carcass in effecting its rapid descent; but, practically, the weight and momentum of the carcass will carry it through the trunk when let fall from above.

Having described my invention, I claim—

1. The hog-cleaning apparatus consisting of the vertical receiving and delivering cylinder, armed on its interior with downwardly-inclined scrapers, as herein shown and described.

2. The open trunk or conduit herein described, suspended from a scalding table or floor, and having a receiving-table at its lower end, upon which the cleaned carcass is delivered by the momentum of its own gravity, substantially as described.

3. The spring stripping-arms provided with spoon-shaped acting points to prevent injury to the skin, as herein shown and described.

4. In combination with the vertical trunk, provided with scrapers, as herein described, the endless hooked chain, as and for the purpose specified.

In testimony whereof I have hereunto set my hand this 21st day of January, A. D. 1873.

DAVID H. SHERMAN.

Witnesses:
A. E. H. JOHNSON,
J. W. HAMILTON JOHNSON.